(12) United States Patent
Gey et al.

(10) Patent No.: US 9,180,530 B2
(45) Date of Patent: Nov. 10, 2015

(54) ROTARY TOOL AND METHOD OF PRODUCING

(71) Applicant: Kennametal Inc., Latrobe, PA (US)

(72) Inventors: Christoph Gey, Zirndorf (DE); Armin Josef Zimmermann, Oberviechtach (DE); Xavier Spichtinger, Oberviechtach (DE)

(73) Assignee: KENNAMETAL INC., Latrobe, PA (US)

( * ) Notice: Subject to any disclaimer, the term of this patent is extended or adjusted under 35 U.S.C. 154(b) by 345 days.

(21) Appl. No.: 13/661,097

(22) Filed: Oct. 26, 2012

(65) Prior Publication Data

US 2013/0108381 A1 May 2, 2013

(30) Foreign Application Priority Data

Oct. 28, 2011 (DE) .......................... 10 2011 117 148

(51) Int. Cl.
| | | |
|---|---|---|
| B23B 27/00 | (2006.01) | |
| B23B 51/00 | (2006.01) | |
| B23C 5/18 | (2006.01) | |
| B23B 51/10 | (2006.01) | |
| B23C 5/02 | (2006.01) | |

(52) U.S. Cl.
CPC ............ B23B 51/009 (2013.01); B23B 51/107 (2013.01); B23C 5/18 (2013.01); B23B 2205/12 (2013.01); B23B 2226/125 (2013.01); B23B 2226/315 (2013.01); B23C 2210/168 (2013.01); B23C 2226/125 (2013.01); B23C 2226/315 (2013.01); Y10T 29/49826 (2015.01); Y10T 407/1906 (2015.01); Y10T 407/27 (2015.01)

(58) Field of Classification Search
CPC ....................................................... B23C 5/109
USPC ........................................ 407/33, 35; 82/1.11
See application file for complete search history.

(56) References Cited

U.S. PATENT DOCUMENTS

| | | | | |
|---|---|---|---|---|
| 4,919,573 | A | * | 4/1990 | Tsujimura et al. ............... 407/40 |
| 5,221,162 | A | * | 6/1993 | Okawa ............................ 407/40 |
| 5,611,251 | A | * | 3/1997 | Katayama .................... 76/108.6 |
| 6,102,630 | A | * | 8/2000 | Flolo ............................... 407/42 |
| 6,203,251 | B1 | * | 3/2001 | Oppelt et al. ................... 407/48 |
| 7,004,689 | B2 | * | 2/2006 | DeRoche et al. ............... 407/48 |
| 7,670,088 | B2 | * | 3/2010 | Andersson et al. ............. 407/33 |
| 7,784,567 | B2 | * | 8/2010 | Choe et al. .................... 175/374 |
| 2002/0037199 | A1 | * | 3/2002 | Satran et al. .................... 407/54 |
| 2008/0138160 | A1 | * | 6/2008 | Fouquer .......................... 407/33 |

(Continued)

FOREIGN PATENT DOCUMENTS

| | | |
|---|---|---|
| DE | 4304104 A1 | 9/1993 |
| DE | 20 2006 002 827 U1 | 5/2006 |
| EP | 2 067 552 A1 | 6/2009 |

(Continued)

*Primary Examiner* — Will Fridie, Jr.
(74) *Attorney, Agent, or Firm* — Larry R. Meenan

(57) ABSTRACT

Rotary tool, such as a drill or milling cutter, having a main tool body, which extends along a center longitudinal axis, which has a flute and which, at a distance from the center longitudinal axis, has an insert seat which is introduced into the flute wall and in which a cutting insert, in particular made of a superhard material such as PCD or PCBN, is fastened integrally, wherein, for fixing both a radial and also an axial position of the cutting insert, the insert seat has an abutment wall which has a contour for positioning the cutting insert in a rotationally locked manner.

13 Claims, 2 Drawing Sheets

(56) References Cited

U.S. PATENT DOCUMENTS

2010/0272525 A1  10/2010  Corbin
2014/0212226 A1*  7/2014  Saji et al. .................. 407/33

FOREIGN PATENT DOCUMENTS

| | | |
|---|---|---|
| JP | 56134106 A | 10/1981 |
| WO | 2004016377 A2 | 2/2004 |

* cited by examiner

ROTARY TOOL AND METHOD OF PRODUCING

BACKGROUND

1. Field of the Invention

The invention relates to a method for producing a rotary tool, and to a rotary tool produced accordingly.

2. Background Information

Hard workpieces, for example, are subjected to cutting machining using drills or milling cutters equipped with special sintered cutting inserts having a cutting-edge region which consists of a superhard material, in particular of PCD (polycrystalline diamond) or of PCBN (polycrystalline cubic boron nitride). Cutting inserts of this type are fastened integrally in a respective insert seat, which is introduced in a main tool body of the rotary tool, in particular by soldering.

A plurality of cutting inserts, for example two or three such cutting inserts, are usually fitted around the circumference of the main tool body. In a stepped tool, for example a stepped drill, further cutting inserts arranged radially further outward are fitted around the circumference in a rear region of the main tool body at a distance from a front tool point. Stepped drills of this type are used, for example, for machining a valve seat and require high-precision orientation of the cutting edges of the cutting inserts.

The main tool body consists, for example, of HSS or hard metal. The insert seats are introduced in a flute wall of a flute introduced into the main tool body and at a distance from a center longitudinal axis of the main tool body. The insert seat in this respect comprises a planar insert support and also an abutment wall arranged at the edge. The insert seat is introduced by a disk-shaped machining tool, for example a side milling cutter or a grinding wheel, such that it assumes an approximately semilunar shape.

A preformed basic cutting insert still to be machined is positioned and firmly soldered into the insert seat. The basic cutting inserts used at present in this respect have an oversize in the range of 3 to 4 mm which is still to be removed. This oversize is the result of the relatively inaccurate positioning and orientation of the prefabricated basic cutting insert in the insert seat shaped like a semilunar circle. The oversize has to be brought to a desired end contour in a subsequent finishing operation. On account of the superhard material of the cutting insert, this is associated with considerable effort. In the case of a tool in this respect, this finishing operation often requires several hours and may last up to ten hours.

The cutting inserts are usually cut out of a so-called blank by means of erosion. Alternatively, laser cutting can also be used for this purpose. The blank is a particular circular unfinished part having a layer structure with a carrier, for example made of hard metal, to which the cutting material (PCD or PCBN) is applied. As an alternative to this, the blank is formed exclusively from the cutting material.

In addition to the intended use described above, in which basic cutting inserts are firstly cut out of the blank and fastened integrally in an insert seat by soldering and then subjected to a finishing operation, such cutting inserts made of a superhard material are also used as indexable cutting inserts, which are fastened in the tool without a further finishing operation. Fine adjustment mechanisms, such as for example adjustment screws, are often provided on the tools in this respect.

A further alternative possible use for such superhard cutting inserts can be gathered from U.S. Pat. No. 5,611,251. According to such document, it is provided that firstly cutting bars with the superhard coating are formed, and these are then inserted into corresponding slots in the main tool body. In this case, the cutting bars extend over the entire tool diameter. This requires a complicated production method for the cutting inserts, however, since the cutting bars have to be equipped with the superhard cutting material on opposing sides over their length extending over the entire diameter. By contrast, simple production of the cutting inserts is made possible in the embodiment variant described above, in which the insert seats are introduced merely on one side and at a distance from the center longitudinal axis.

It is furthermore known from DE 20 2006 002 827 U1 and from EP 2067552 A1 to introduce contours into the surface of such cutting inserts, for example for forming chip breaker grooves.

SUMMARY OF THE INVENTION

The present invention improves upon conventional designs and methods by providing a rotary tool having a cutting insert made of superhard material, in which the production is simplified, in particular the machining time required for the finishing operation is reduced compared to the finishing machining time required to date. The invention is furthermore based on the object of specifying a simplified method for producing such a drilling tool. Finally, the invention is furthermore based on specifying a simplified method for producing a cutting insert.

As one aspect of the invention, a rotary tool, in particular a drill or milling cutter and preferably a stepped drill or stepped milling cutter, having a main tool body which extends along a center longitudinal axis and which has at least one flute, preferably a plurality of flutes is provided. At a distance from the center longitudinal axis, an insert seat, in which a cutting insert, in particular made of superhard material such as PCD or PCBN, is fastened integrally, in particular by soldering, is introduced into the flute wall. For fixing in particular a radial and preferably also an axial position of the cutting insert, the insert seat has an abutment wall which forms a contour for positioning the cutting insert in a rotationally locked manner. The insert seat and the cutting insert are therefore oriented in a rotationally locked manner in a defined (rotary) position by mutually complementary contouring.

In contrast to the existing insert seats shaped like a semilunar circle, in which the abutment wall runs along a circular arc, it is therefore now provided that the abutment wall has a defined contour differing from the circular shape, such that the basic cutting insert worked out of the blank is positioned in an already defined desired position in the insert seat before the basic cutting insert is soldered in the insert seat. This measure of contouring the abutment wall for rotationally locked positioning provides the particular advantage that the basic cutting insert can be worked out with considerably more accurate contours. The required oversize of the basic cutting insert can be reduced considerably compared to an insert seat shaped like a semilunar circle, and therefore considerably reduced material removal is required in the required finishing operation and the finishing operation can thereby be effected much quicker. Overall, this reduces the time required for producing the production tool, and this leads to a considerable cost saving.

In this case, the insert seat is preferably introduced into the main tool body using a grinding or cutting machining tool, in particular a grinding wheel or a milling cutter, preferably a side milling cutter, and has at least one rounded portion running along a circular arc. This makes it possible to introduce the insert seat into the main tool body in a particularly quick and efficient manner. In this case, it is preferable that the curvature of the rounded portion corresponds to the radius of the machining tool, i.e. for example to the radius of the grinding wheel or of the milling cutter. Generally, the insert seat is worked out using a disk-shaped machining tool. This is moved along the desired contour of the abutment wall; the smallest radius of the abutment wall is in this case predefined by the radius of the disk-shaped machining tool and is in this respect a characteristic feature of this cost-effective introduction of the insert seat. In this respect, the machining tool is introduced in the radial direction with respect to the center longitudinal axis, without however reaching or crossing the tool center. The insert seat is introduced into the flute which has already been worked in. Alternatively, the insert seat can also be introduced by laser machining or an erosion process, particularly in the case of very filigree contours.

A rotary tool is generally considered to be a tool which extends in the direction of a rotational or longitudinal axis and is formed for rotary operation about the rotational axis. In principle, however, the tool can also be used in stationary form and the workpiece can be used in rotary form.

According to an example configuration, the abutment wall has at least one rectilinear portion. This predefines a defined rotational orientation in a simple manner. Expediently, in this respect a plurality of rectilinear portions are provided. It is preferable for a rounded portion to be arranged between two neighboring rectilinear portions. The rectilinear portions serve here in particular both for the radial and for the axial positioning.

According to an example configuration, the contour of the abutment wall is formed in the manner of a piece of a puzzle, the insert seat to this end having a restriction which engages a stud-like continuation extending from the insert. This is effected in particular with the formation of an undercut, i.e. a type of constriction is provided toward the continuation. The continuation in this case is formed in the manner of a stud and has a rounded form. The continuation extends, in particular, inward in the direction toward the main body. This has a complementary recess. The inwardly directed continuation has the advantage of the lowest possible material weakening of the main tool body. In this configuration in the manner of a piece of a puzzle, the cutting insert is therefore generally held in the insert seat in a form-fitting manner. As an alternative, the stud-like continuation may extend from the main body and cooperatuively engage a constriction formed in the insert.

In an example configuration, the abutment wall has a convex-concave curvature at least in a partial region. The abutment wall is therefore curved at least in a partial region, for example has an approximately s-shaped form, as a result of which rotationally locked positioning is likewise ensured.

In order for the basic cutting insert to be held securely against the planar insert support of the insert seat, in a preferred configuration the abutment wall is formed in a manner inclined obliquely with respect to the insert support, such that, together with a side wall of the cutting insert, it forms an undercut or else a so-called underdraft. The cutting insert is therefore also held in a form-fitting manner in the direction perpendicular to the insert support. The machining tool for introducing the insert seat preferably has a contouring complementary to the underdraft and, as seen in cross section, in particular has a trapezoidal form.

As another aspect of the invention, a method for producing a rotary tool is provided. In the method, a cutting insert is positioned and fastened in the insert seat in a predefined desired rotational orientation. This is achieved by complementary contouring between the cutting insert and the insert seat, which predefines the desired rotational orientation.

The cutting inserts are preferably formed with an oversize with respect to a desired end geometry upon positioning as basic cutting inserts. The oversize is in this case preferably formed merely in a cutting-edge region of the cutting insert. Compared to the desired end geometry, the oversize is merely approximately 0.1-0.3 mm.

The oversize is expediently removed after the basic cutting insert has been integrally fastened. For this purpose, different machining processes are available, for example an erosion process, a grinding process or else a laser removal process.

In another example configuration, it is provided that the basic cutting insert already has a contouring, in particular a chip breaker groove, on its top flat side in the superhard cutting material. In this case, contouring is spaced apart, compared to a desired end position, by an oversize too far from an edge of the cutting body. This oversize is then removed during the finishing operation. The introduction of the chip breaker groove, i.e. in particular a specially defined recess in the surface of the cutting insert, already before the actual fastening in the main tool body is made possible for the first time by the highly accurate pre-positioning, and is a further essential element in the simplification of the production process. Since the position of the chip breaker groove is fixed sufficiently accurately by the precise orientation of the basic cutting insert in the insert seat, it is possible to introduce the chip breaker groove into the basic cutting insert already beforehand. The particular advantage of this is that this contour can be introduced in a two-dimensional plane and does not have to be introduced on the tool in the soldered-in state, which requires very complex machining kinematics in three dimensions.

According to another aspect of the invention, for producing a cutting insert made of a superhard material it is provided according to the invention that firstly a common blank for a multiplicity of cutting inserts is provided, and a surface contour, in particular a chip breaker groove, is introduced into the respective cutting inserts before the cutting inserts are cut out of the blank.

The blank is customarily a layer structure consisting of a carrier, in particular a hard metal carrier, to which a layer made of the superhard cutting material is applied at least on one side. Alternatively, the blank consists exclusively of the cutting material. The introduction of the surface contour therefore becomes very simple in procedural terms, since the machining tool merely has to be moved two-dimensionally in the plane defined by the surface of the blank. The depth of the desired contour is then achieved by simple introduction perpendicular to the surface. It is crucial, however, that the surface contour is not introduced on the tool.

BRIEF DESCRIPTION OF THE DRAWINGS

Exemplary embodiments of the invention will be explained in more detail below with reference to the figures. In these figures, which are each represented schematically and in greatly simplified form.

DESCRIPTION OF AN EXEMPLARY EMBODIMENT

Figure 1:
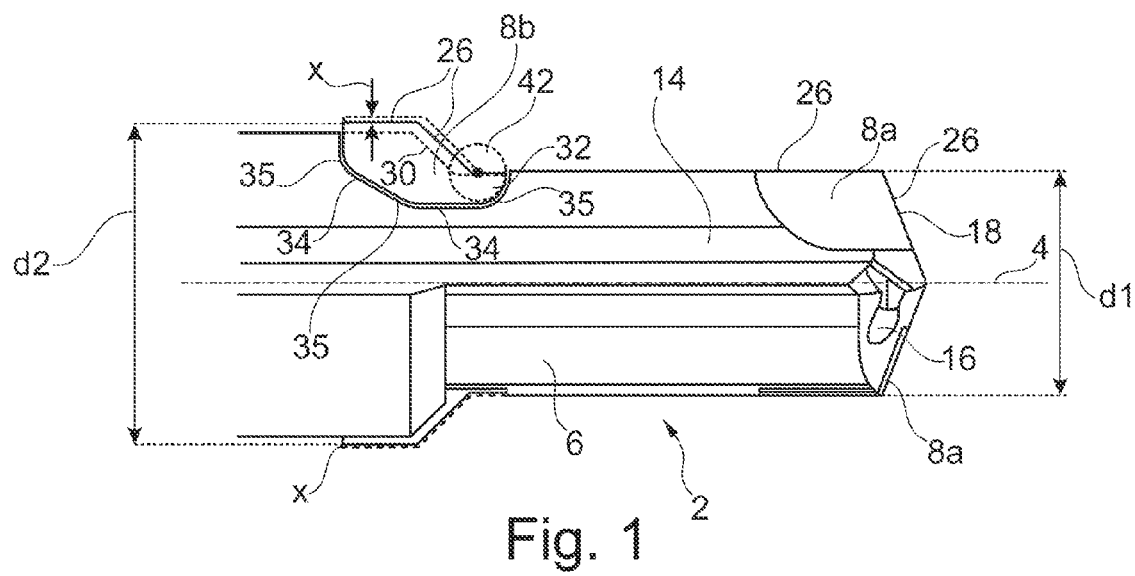
FIG. 1 shows a side view of a detail of a stepped drill according to a first example embodiment of the invention.

The rotary tool, formed in the exemplary embodiment as a stepped drill 2, extends along a center longitudinal axis 4 and has a main tool body 6, which is equipped with soldered-in cutting inserts 8a, 8b. The main tool body 6 has a cutting-edge region 10, which is adjoined at the rear by a clamping shank 12 (cf. in this respect FIG. 4). A flute 14, which runs rectilinearly in the exemplary embodiment, is worked in in the cutting-edge region 10. As an alternative to this, coiled flutes 14 can also be provided. Furthermore, coolant bores 16, which exit at the end in the exemplary embodiment, are worked into the main tool body 6.

The stepped drill 2 has a conical drill point 18. In the longitudinal direction, the stepped drill 2 forms a step at a distance from the drill point 18, i.e. it has an enlarged drill diameter there. Whereas a first, relatively small nominal drill diameter d1 is defined at the drill point 18, a second, large nominal drill diameter d2 is fixed in the region of the step. In this case, the step is spaced apart from the drill point 18 preferably by a multiple of the nominal drill diameter d1.

The cutting inserts 8a are arranged in the region of the drill point 8 and the cutting inserts 8b are arranged in the region of the step. In the exemplary embodiment, the cutting inserts 8a, 8b are thus arranged in each case in pairs with a rotational offset of 180 degrees with respect to the center longitudinal axis 4 around the circumference of the stepped drill 2. As shown in the sectional view of FIG. 3B, the cutting inserts 8a, 8b have a layer structure made up of a carrier 20 and a superhard coating 22 made of PCD or PCBN which is applied thereto. The cutting inserts are therefore sintered cutting inserts 8a, 8b.

In the region of the step or the shoulder, the cutting inserts 8b have an obliquely running portion, which is oriented at an angle with respect to the center longitudinal axis 4. This portion serves, for example, for machining a valve seat surface. This is dependent on a highly precise orientation of the cutting inserts 8b. A cutting edge 26, which is formed by the respective cutting insert 8a, 8b, therefore has to be positioned in a highly precise manner both in terms of its inclination with respect to the longitudinal direction and also in terms of its radially outer position.

Figure 2:
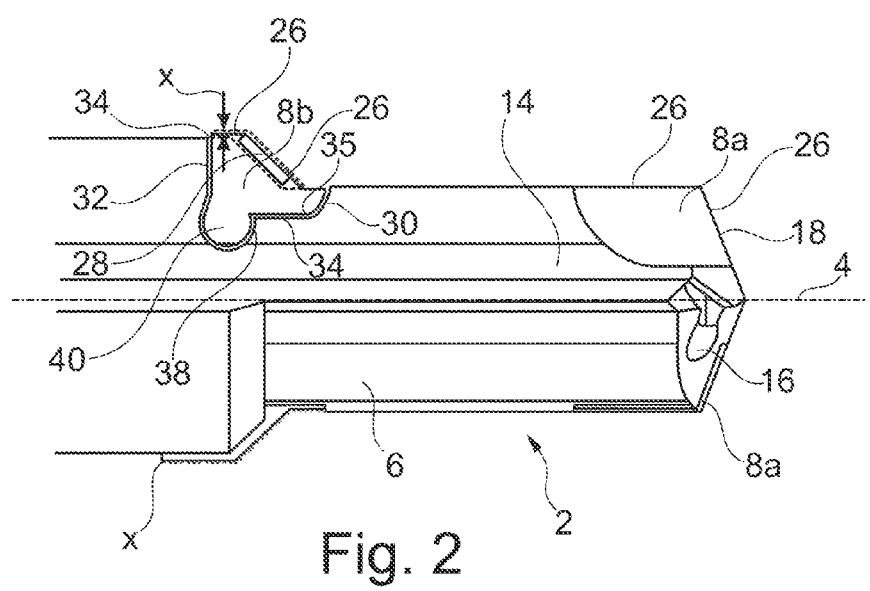
FIG. 2 shows a side view of a detail similar to FIG. 1 according to a second example embodiment of the invention.

Adjacent to the cutting edge 26, the cutting insert 8b in the exemplary embodiment of FIG. 2 has a chip breaker groove 28, which is shown schematically.

In order to achieve this highly precise positioning, it is necessary to perform a finishing operation on the soldered-in cutting insert 8a, 8b. The cutting insert 8b is therefore initially produced as a basic cutting insert having an oversize x and soldered into an insert seat 30. The oversize x and the profile of the insert seat 30 are indicated in FIGS. 1 and 2 by a dashed line. The insert seat 30 has an abutment wall 32 having a contour to which the cutting insert 8a, 8b is also adapted.

In the exemplary embodiment of FIG. 1, the contour is formed by two rectilinear portions 34, one portion running parallel to the center longitudinal axis 4 and the second portion adjoining the first rectilinear portion 34 at an angle, with the formation of a rounded portion 35. At the ends, the two rectilinear portions 34 are adjoined in turn by rounded portions 35, which in turn can be adjoined by rectilinear portions. Overall, the contour for the cutting insert 8b as per FIG. 1 is therefore defined by a sequence of a plurality of rectilinear portions 34 and rounded portions 35.

In an alternative configuration as per FIG. 2, the contour has a profile in the manner of a piece of a puzzle, with a stud-like continuation 40 being formed, with the formation of a constriction 38. The continuation 40 is adjoined at each end by rectilinear portions 34, these being oriented at a right angle to one another in this exemplary embodiment. The rectilinear portion 34 running parallel to the center longitudinal axis 4 is adjoined by a rounded portion 35 at the end. As an alternative to the exemplary embodiment shown, the continuation 40 is oriented in the direction toward the cutting edge 26, such that the cutting insert therefore has a recess, into which a correspondingly formed stud of the insert seat is inserted.

The insert seat 30 and the abutment wall 32 for the cutting insert 8b are generally characterized by the fact that both a top and also a bottom portion of the abutment wall 32 which run radially outward toward the circumferential side are formed. This characterizes the configuration of the insert seat 30 in the region of the step, in which the cutting insert bears against the abutment wall 32 in the axial direction both toward the drill point 18 and toward the clamping shank 12. The top radial portion in this case runs as far as the outer circumference approximately in the region of the nominal diameter d1, whereas the bottom radial portion runs approximately as far as the outer circumference in the region of the nominal diameter d2.

The insert seats 30 are formed with these contour profiles by using a disk-shaped machining tool 42, as is indicated in FIG. 1 likewise by a dashed line. This tool is, for example, a grinding wheel or else a side milling cutter. The radius of the machining tool 42 defines the rounded portions 35.

The cutting inserts 8a in the region of the drill point 18 also have a rotationally locked contour. In the exemplary embodiment, this is formed simply by the combination of a rectilinear portion 34 with a rounded portion 35.

The special contour profile of the insert seat 30 and the corresponding complementary configuration of the cutting inserts 8a, 8b make it possible to machine even the basic cutting insert with the greatest possible accuracy and to near-net shape. The oversize x, which is present merely in the region of the cutting edge 26, is therefore merely approximately 0.1 to at most 0.3 mm, preferably merely 0.1-0.2 mm.

Figure 4:
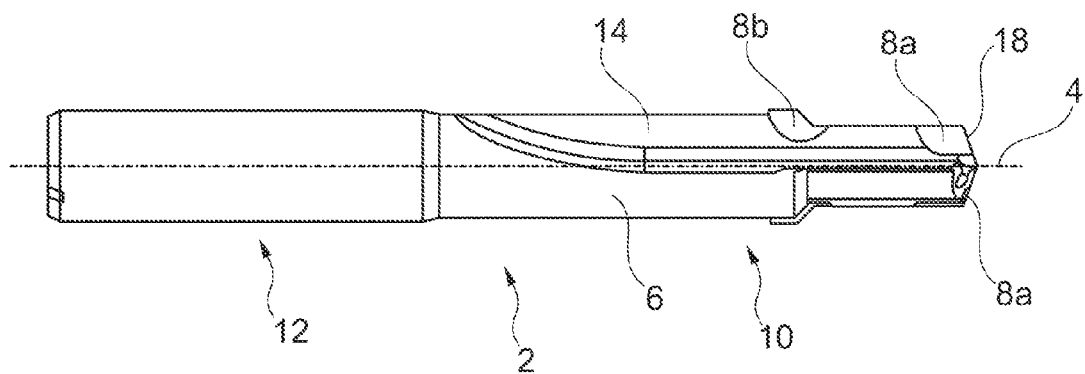
FIG. 4 shows a side view of a stepped drill having a conventional insert seat approximately shaped like a semilunar circle.

Compared to the procedure to date, as is shown in FIG. 4 in the region of the step having the semilunar cutting insert 8b, this makes it possible to achieve a considerably smaller oversize. On account of the configuration like a semilunar circle to date, relatively poor rotational positioning of the cutting insert 8b was possible, and therefore a considerably greater oversize x was required.

Figure 3B:
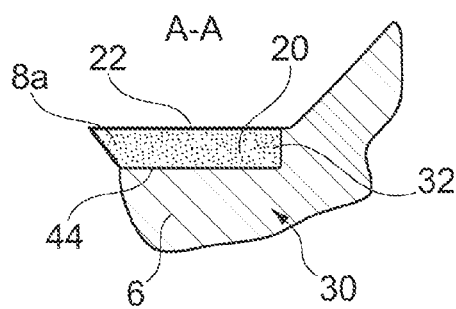
FIG. 3B shows a sectional illustration of a detail according to the line of intersection A-A in FIG. 3A.
Figure 3A:
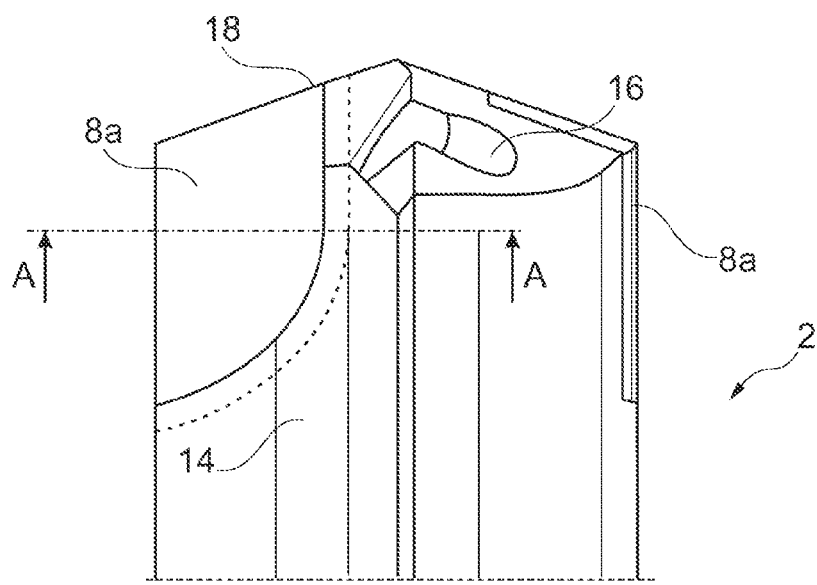
FIG. 3A shows an enlarged side illustration of a detail of a stepped drill in the region of a tool point.

As can be gathered in particular from FIGS. 3A and 3B, the abutment wall 32 of the insert seat 30 is formed in a manner inclined obliquely with respect to an insert support 44, such that an undercut in the manner of a dovetail is formed between the insert seat and the cutting insert 8a. The basic cutting insert is thereby held against the insert support 44 even as it is being positioned during the soldering-in process. This undercut is achieved, for example, in a simple manner by a correspondingly complementary configuration of the disk-shaped machining tool 42 of, for example, trapezoidal cross section. The undercut is therefore formed automatically by the contouring of the disk-like machining tool 42.

Figure 5:
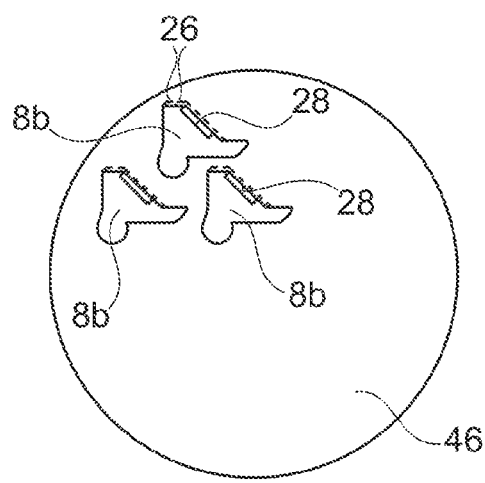
FIG. 5 shows a schematic plan view of a blank with contours, shown by way of example, of basic cutting inserts.

As can be gathered from FIG. 5, the basic cutting inserts 8b are worked out of a blank 46. In this case, the chip breaker groove 28 is firstly worked in at the respective position of the cutting insert 8b, to be precise in the region of the provided cutting edge 26. Only then are the individual basic cutting inserts 8b cut out of the blank 46 by a suitable cutting process, to be precise with the oversize x. The highly accurate pre-positioning resulting from the special contouring makes it possible for the first time to introduce the chip breaker groove 28 in an early manufacturing stage already before fastening on the main tool body 6.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A rotary tool comprising:
   a main tool body which extends along a center longitudinal axis, the main tool body including a conical drill point having a first drill diameter, and a step spaced from the conical drill point along the center longitudinal axis having a second drill diameter larger than the first drill diameter;
   a flute formed in the main tool body;
   an insert seat formed in the step of the main tool body and formed in a wall of the flute; and
   a cutting insert disposed in the insert seat, the cutting insert comprising a generally planar body portion made of a superhard material such as PCD or PCBN; and a contour formed on an edge of the generally planar body which is structured to engage a correspondingly shaped portion of an insert seat of a tool body in a manner that rotationally locks the cutting insert with respect to the tool body, wherein the contour is formed in the manner of a piece of a puzzle and includes a studlike continuation which projects from the edge of the generally planar body and which is structured to be disposed in a correspondingly shaped constriction extending outward from an edge of the insert seat,
   wherein, for fixing the position of the cutting insert with respect to the main tool body, the insert seat includes an abutment wall which has a contour for positioning the cutting insert in a rotationally locked manner,
   wherein the contour of the abutment wall is formed in the manner of a piece of a puzzle and the insert seat includes a constriction which cooperatively engages the stud-like continuation extending from the cutting insert.

2. The rotary tool of claim 1 wherein the insert is made of a superhard material such as PCD or PCBN.

3. The rotary tool of claim 1 wherein the insert seat is formed in the main tool body with the aid of a cutting machining tool and wherein the abutment wall has at least one rounded portion as a result of the cutting machining.

4. The rotary tool of claim 1 wherein the abutment wall has at least one rectilinear portion.

5. The rotary tool of claim 4 wherein the abutment wall includes a plurality of rectilinear portions, between each of which there is arranged a rounded portion.

6. The rotary tool of claim 1 wherein the stud-like continuation points inward toward the main tool body.

7. The rotary tool of claim 1 wherein the abutment wall has a convex-concave curvature.

8. The rotary tool of claim 1 wherein the insert seat has an insert support on which the abutment wall runs at the edge and wherein the abutment wall is inclined obliquely with respect to the insert support and forms an undercut with a side wall of the cutting insert.

9. A method for producing a rotary tool, the method comprising: providing a main tool body having at least one insert seat with an insert support and an abutment;
   positioning a cutting insert having a contouring which is complementary to the insert seat and which rotationally locks the cutting insert with respect to the insert seat; and
   integrally fastening the cutting insert to the main tool body,
   wherein the cutting insert has a top side which lies opposite the insert support and into which a surface contour is introduced before the insert is fastened in the insert seat,
   wherein the surface contour is a chip breaker groove which, compared to a desired end position, is spaced apart by an oversize region, and
   wherein the method further comprises removing the oversize region after the insert has been fastened in the insert seat.

10. The method of claim 9 wherein integrally fastening the cutting insert to the main tool body comprises soldering the cutting insert to the insert seat.

11. The method of claim 9 wherein the cutting insert has an end geometry in the finished rotary tool and the cutting insert has a basic geometry which is adapted to an end geometry and wherein, in a cutting-edge region, the basic geometry has a small oversize in the range of 0.1-0.3 mm compared to the end geometry.

12. The method of claim 9 wherein the cutting insert has a basic geometry which, in a cutting-edge region, has an oversize in the range of 0.1-0.3 mm compared to an end geometry and wherein the method further comprises machining the insert to the end geometry.

13. The method of claim 9 further comprising forming the at least one insert seat in the main tool body with the aid of a grinding or milling method.

* * * * *